United States Patent
Hatlelid et al.

(10) Patent No.: US 8,924,714 B2
(45) Date of Patent: Dec. 30, 2014

(54) AUTHENTICATION WITH AN UNTRUSTED ROOT

(75) Inventors: Kristjan E. Hatlelid, Sammamish, WA (US); Kelvin S. Yiu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 12/163,458

(22) Filed: Jun. 27, 2008

(65) Prior Publication Data

US 2009/0327696 A1 Dec. 31, 2009

(51) Int. Cl.
*H04L 29/00* (2006.01)
*H04L 9/32* (2006.01)
*H04L 29/06* (2006.01)

(52) U.S. Cl.
CPC ............ *H04L 9/321* (2013.01); *H04L 63/0823* (2013.01); *H04L 9/3265* (2013.01); *H04L 2209/805* (2013.01)
USPC ........... 713/156; 713/166; 713/168; 713/175; 713/184; 713/189; 726/5; 726/6; 726/19; 726/28; 726/29; 709/238

(58) Field of Classification Search
USPC ........... 713/156, 166, 18, 175, 176, 184, 189; 726/5, 6, 19, 28, 29; 709/238
See application file for complete search history.

(56) References Cited

U.S. PATENT DOCUMENTS

| | | | |
|---|---|---|---|
| 6,584,466 B1 * | 6/2003 | Serbinis et al. ............... | 715/209 |
| 7,275,102 B2 | 9/2007 | Yeager et al. | |
| 7,392,196 B2 * | 6/2008 | Yagasaki et al. ............... | 705/319 |
| 7,600,123 B2 * | 10/2009 | Parupudi et al. ............... | 713/175 |
| 2002/0095399 A1 * | 7/2002 | Devine et al. ..................... | 707/1 |
| 2003/0028805 A1 * | 2/2003 | Lahteenmaki ................. | 713/201 |
| 2003/0212888 A1 * | 11/2003 | Wildish et al. ................ | 713/158 |
| 2004/0133774 A1 | 7/2004 | Callas et al. | |
| 2004/0250062 A1 * | 12/2004 | Douglas ........................ | 713/156 |
| 2004/0250075 A1 * | 12/2004 | Anthe et al. ................... | 713/175 |
| 2005/0071630 A1 * | 3/2005 | Thornton et al. ............. | 713/156 |

(Continued)

FOREIGN PATENT DOCUMENTS

WO    WO2007128134 A1    11/2007

OTHER PUBLICATIONS

Alsaid et al., "Preventing Phishing Attacks Using Trusted Computing Technology", retrieved at <<http://isg.rhbnc.ac.uk/cjm/ppautc.pdf>>, Proceedings 6th Intl Network Conf (INC 2006), Jul. 2006, 8 pg.

(Continued)

*Primary Examiner* — Beemnet Dada
*Assistant Examiner* — Sayed Beheshti Shirazi
(74) *Attorney, Agent, or Firm* — Timothy Churna; Kate Drakos; Micky Minhas

(57) ABSTRACT

Techniques and systems for authentication with an untrusted root between a client and a server are disclosed. In some aspects, a client may connect to a server. The server and client may initiate a secure connection by exchanging certificates. The server may accept a client certificate having an untrusted root that does not chain up to a root certificate verifiable to the server certificate authority. In further aspects, the server may enable the client to associate an untrusted certificate with an existing account associated with the server. The client certificate may be hardware based or generated in software, and may be issued to the client independent of interactions with the server.

20 Claims, 8 Drawing Sheets

(56) References Cited

U.S. PATENT DOCUMENTS

| | | | |
|---|---|---|---|
| 2005/0125661 A1* | 6/2005 | Vaidyanathan | 713/166 |
| 2006/0075219 A1 | 4/2006 | Callaghan et al. | |
| 2006/0143700 A1* | 6/2006 | Herrmann | 726/14 |
| 2006/0200675 A1* | 9/2006 | Maeng et al. | 713/176 |
| 2006/0282670 A1 | 12/2006 | Karchov | |
| 2007/0050625 A1 | 3/2007 | Mitchell et al. | |
| 2007/0106897 A1* | 5/2007 | Kulakowski | 713/171 |
| 2007/0113101 A1* | 5/2007 | LeVasseur et al. | 713/189 |
| 2007/0143596 A1 | 6/2007 | Myers et al. | |
| 2007/0150737 A1* | 6/2007 | Parupudi et al. | 713/175 |
| 2007/0168550 A1* | 7/2007 | Wang et al. | 709/238 |
| 2007/0209081 A1* | 9/2007 | Morris | 726/29 |
| 2007/0255743 A1* | 11/2007 | Gaucas | 707/102 |
| 2008/0097799 A1* | 4/2008 | Scribner | 705/5 |
| 2008/0126484 A1* | 5/2008 | Wherry et al. | 709/204 |
| 2008/0163346 A1* | 7/2008 | Wray et al. | 726/6 |
| 2008/0306875 A1* | 12/2008 | Mardikar | 705/71 |
| 2009/0037728 A1* | 2/2009 | Kamikura | 713/156 |
| 2009/0049513 A1* | 2/2009 | Root et al. | 726/1 |
| 2009/0055908 A1* | 2/2009 | Rapoport | 726/6 |
| 2009/0138974 A1* | 5/2009 | Perdomo et al. | 726/28 |
| 2009/0165098 A1* | 6/2009 | Ifrah | 726/5 |
| 2009/0210334 A1* | 8/2009 | Russell | 705/35 |
| 2009/0245184 A1* | 10/2009 | Torres et al. | 370/329 |
| 2010/0017608 A1* | 1/2010 | Larsen | 713/168 |
| 2010/0042848 A1* | 2/2010 | Rosener | 713/184 |
| 2012/0317224 A1* | 12/2012 | Caldwell et al. | 709/217 |

OTHER PUBLICATIONS

Boncella, "Web Security for E-Commerce", retrieved at <<http://www.aegean.gr/culturaltec/dgavalas/ECommerce/papers/ecom-merce_security.pdf>>, Communications of the Association for Information Systems, vol. 4, Article 11, Nov. 2000, 22 pgs.

"Obtaining Certificates for Client Authentication", retrieved on Apr. 23, 2008 at <<http://publib.boulder.ibm.com/infocenter/hodhelp/v9r0/index.jsp?topic=/com.ibm.hod9.doc/help/clobtaincert.html>>, 2 pgs.

"Personal Certificate Import Utility for Pocket PC 2003 and Windows Mobile", retrieved on Apr. 23, 2008 at <<http://www.jacco2.dds.nl/networking/p12imprt.html#Obtaining_certs>>, 23 pgs.

"The Advantages of Protected Extensible Authenication Protocol (PEAP): A Standard Approach to User Authentication for IEEE 802.11 Wireless Network Access", Microsoft Corporation, retrieved at <<http://download.microsoft.com/download/4/4/7/447404a7-c373-4bf4-9c77-daee54b1f6fc/PEAP.doc>>, Jul. 2003, 17 ogs.

* cited by examiner

AUTHENTICATION WITH AN UNTRUSTED ROOT

BACKGROUND

Important networked resources are being made accessible over computer networks in ever greater frequency. An increased effort to ensure secure connections follows as more data is exchanged via networks which are exposed to threats such as hacking schemes that comprise security. Access to less sensitive or valuable networked resources may be sufficiently controlled based on logon identities and passwords. However, other networked resources may require enhanced protection provided by more complex authentication methods and systems.

Certificate initiated authentication is significantly more secure than a password initiated authentication. Typically, a process of authenticating a client and a server requires a shared hierarchical structure that enables both the client and the server to verify the authenticity of one another's certificates. In some instances, the client may have received a certificate directly from the server, such as when a server host issues the client a smartcard that includes the certificate. Today, if an entity wants to use a certificate initiated authentication, such as public key infrastructure (PKI) identity, for its customers, the entity has to act as a certificate authority (CA) and issue a new identity for the customer.

The process of issuing the new identity and configuring the secure connection with the certificate does not scale well for either the entity or the customer. Certificates are expensive, require hierarchy trust chain, and take time and resources to configure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Techniques and systems for authentication with an untrusted root between a client and a server are disclosed. In one or more aspects, a client may connect to a server. The server and client may initiate a secure connection by exchanging certificates. The server may accept a client certificate that does not chain up to a root certificate verifiable to the server certificate authority.

In further aspects, the server may enable the client to associate an untrusted certificate with an existing account associated with the server. The server may associate the certificate directly with the account during subsequent connections with the client.

The client certificate and private key may be stored as an algorithm and hardwired into an integrated circuit card (e.g., on a smartcard, etc.) or the client certificate and private key may be stored in a computer readable media on the client machine or elsewhere. In some aspects, the client may be directed to generate or cause to generate a certificate prior to or during a request for a certificate from the server.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to embodiments that facilitate authentication by a target server of a client having an untrusted root. In one or more embodiments of the disclosure, the client is assumed to either 1) have a certificate available such as in a government issued identification card (ID card), an employer ID card, a mobile phone having certificate, etc.; or 2) obtain a custom generated certificate such as by obtaining a smart card, acquiring a software based certificate, or obtaining a certificate from another third party source. The client may identify itself and establish a secure channel with the server without having the certificate chain up to a root that the server trusts. However, the client has to configure the certificate to enable authentication with the server without relying on a traditional hierarchy or distribution of certificates issued from the target server. Various examples of authenticating a client with an untrusted root on a server are described below with reference to FIGS. 1-8.

Illustrative System Architecture

Figure 1:
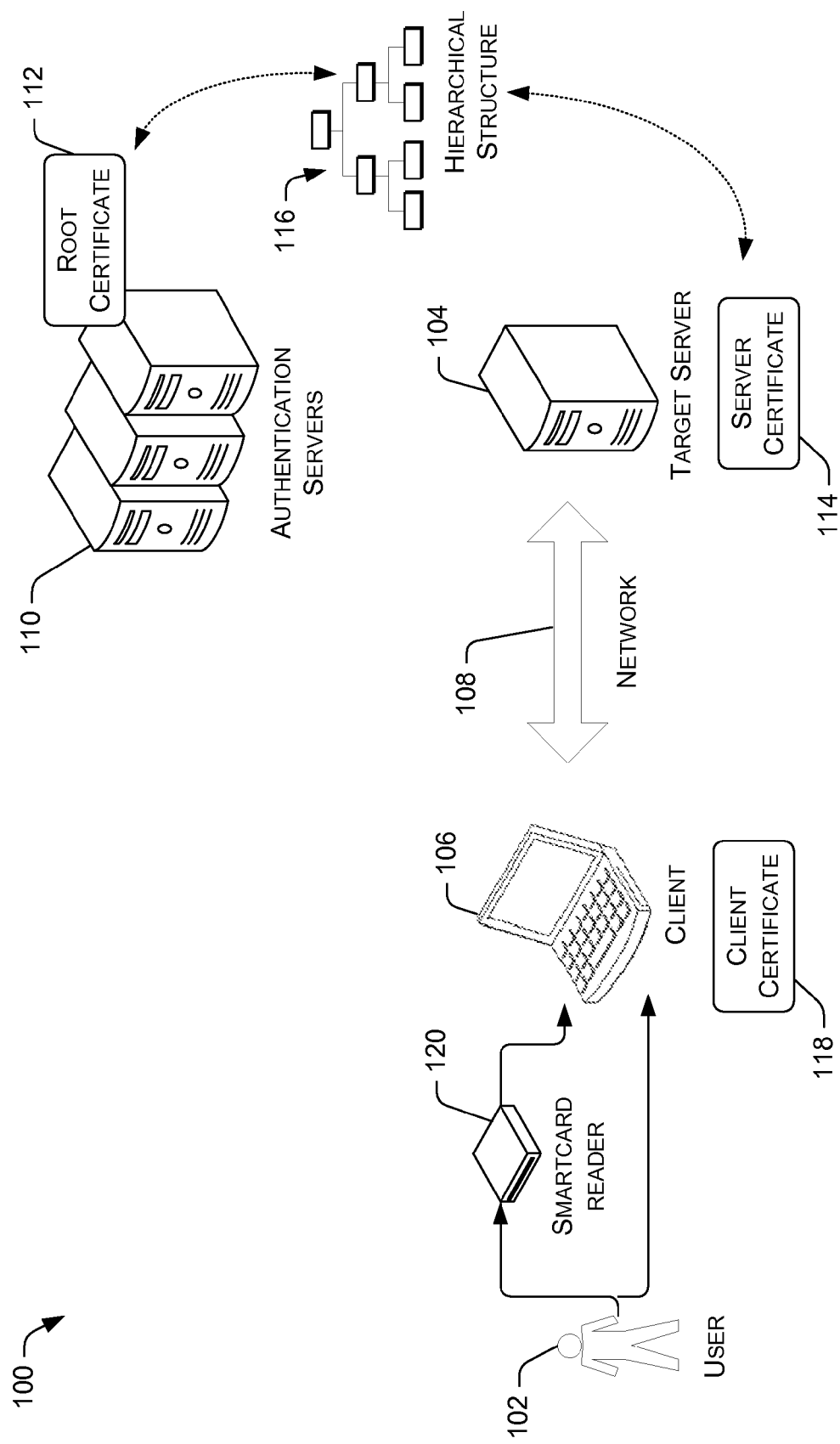
FIG. 1 is an illustrative system that may be used to implement at least one embodiment of authentication of an untrusted root between a client and a server.

FIG. 1 is an illustrative system 100 that may be used to implement at least one embodiment of authentication of an untrusted root between a client and a server. The system 100 enables a user 102 to authenticate the user's identity to a target server 104 via a client computing device 106 (or simply "client"). The client 106 may be a mobile or desktop computer, a personal data assistant (PDA), an internet appliance, an internet enabled mobile phone, or any other computing device configured with a network connection. The system 100 may include at least one network 108, such as a wide-area network (WAN), a local area network (LAN), and the like.

The target server 104 may be in communication with one or more authentication servers 110. The authentication servers 110 may be connected to the target server 104 by a wired connection (e.g., LAN, WAN, etc.) or a wireless connection (e.g., cellular, WiFi, Ultrawideband, etc.). The authentication servers 110 may have a root certificate 112. The authentication servers 110 may be a certificate authority (CA) and issue a server certificate 114 to the target server 104. In some embodiments, the authentication servers 110 may authenticate the server certificate 114 for the target server during an authentication process between the target server 104 and the client 106. For example, the authentication servers 110 may issue the server certificate 114 to the target server, which may then transmit the server certificate to the client 106 during an authentication process, such as a symmetric-key encryption process.

In one or more embodiments, the user 102 may present an identity for authentication to the authentication server 110, via the client 106, by transmitting a client certificate 118 to the target server 104. For example, in some embodiments, the client certificate and associated private key 118 that is stored as an algorithm that is hardwired into an integrated circuit card (ICC), also known as a smart card. Hardware based certificates and private keys may also be hardwired in other hardware based devices, such as universal serial bus (USB) memory devices and secure digital (SD) cards, which may also include volatile or non-volatile memory. In other embodiments, the client certificate 118 may be in the form of software data stored in a computer-readable storage media such as a hard drive connected to the client 106, a storage database associated with a web server, a USB drive, or another computer-readable storage device accessible by the client 106.

Accordingly, in instances where a hardware-based authentication is implemented, the user 102 may authenticate the user's identity to the authentication server 104 by presenting the client certificate 118. A certificate, such as the client certificate 118, may contain a public key which is associated with a private key stored in a location accessible to the client (e.g., smart card, file system, registry, etc). A smart card reader 120 may relay signals from the smart card to the client 106, via an interactive link. Nevertheless, it will be appreciated that in alternative instances, the identity certificates and/ or one or more cryptographic keys, may be further stored in other computer-readable media, including flash drives, radio-frequency identification (RFID) tags, as well as other portable data storage devices.

The user 102 may authenticate the user's identity to the target server 104 via a variety of authentication protocols. These authentication protocols may include without limitation a Transport Layer Security (TLS) protocol, a Secure Sockets Layer (SSL) protocol, a NT LAN Manager (NTLM) protocol, a Kerberos protocol, a Web Services (WS)-security protocol, and a Public Key Cryptography for Initial Authentication in Kerberos (PKINIT) protocol. Typically, these forms of authentication protocols do not occur at the message layer using a user ID and password or tokens, but occur during the connection handshake using certificates.

Figure 2:
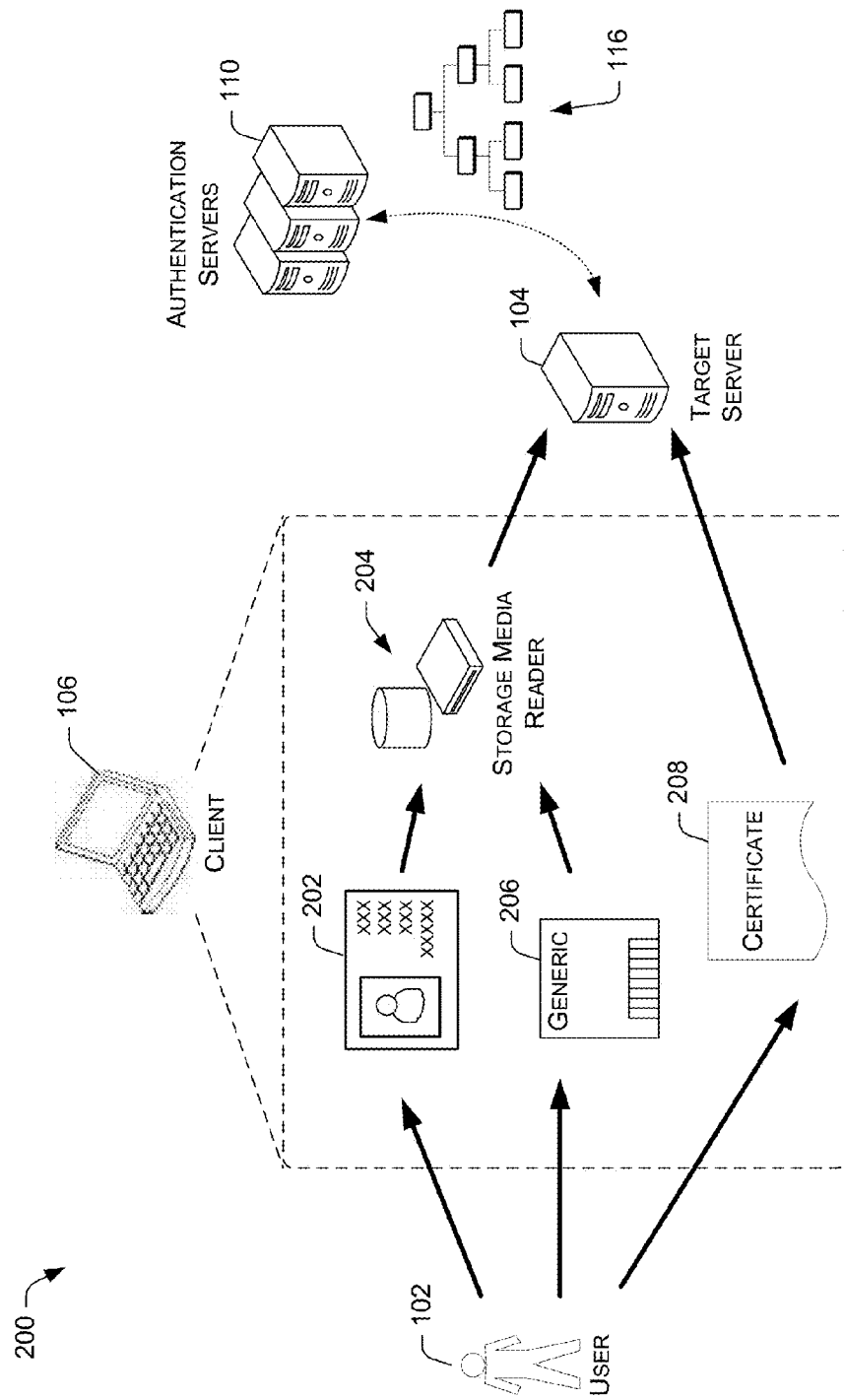
FIG. 2 shows an illustrative system for obtaining an untrusted root certificate for transmission to a server according to at least one embodiment of authentication of an untrusted root between a client and a server.

FIG. 2 shows an illustrative system 200 for obtaining an untrusted root certificate for transmission to a server. The system 200 includes the user 102 and the client computing device 106. In order to create a secure connection between the client 106 and the target server 104, the user 102 must obtain a certificate to satisfy a certificate request from the target server 104.

In one or more embodiments, the user 102 may have an issued certificate 202. For example, the user 102 may have been issued a national or government ID which includes a certificate (e.g., a smartcard, etc.). The issued certificate 202 may not be associated with the target server, the authentication servers, or chain up to the hierarchical structure 116.

The user 102 may receive a request from the target server 104 to transmit the issued certificate 202 to authenticate a connection between the client 106 and the target server. The user 102 may insert the issued certificate 202 into storage media reader 204, which may facilitate transmission of the issued certificate to target server 104 via the client 106.

In other embodiments, the user 102 may not have an issued certificate 202. For example, the user's government agencies may not issue certificates on smartcards. In such instances, the user 102 may obtain a generic certificate 206. The generic certificate 206 may not be associated with the user 102. For example, the user 102 may purchase the generic certificate 206 in a marketplace, such as an electronics store, a grocery store, or a convenience store. The user 102 may insert the generic certificate 206 into the storage media reader 204 when the target server 104 requests a certificate from the user 102.

In further embodiments, the user may generate a certificate which may be stored in a computer readable media. A generated certificate 208 may be generated by software installed on the client 106 or may be generated by a third party, such as an online retailer. The generated certificate may be encrypted on computer readable media made accessible to the client 106. The user 102 may transmit the generated certificate 208 to the target server 104, via the client 106, to initiate a secure connection upon receiving a certificate request from the target server.

Illustrative Operation

Figure 3:
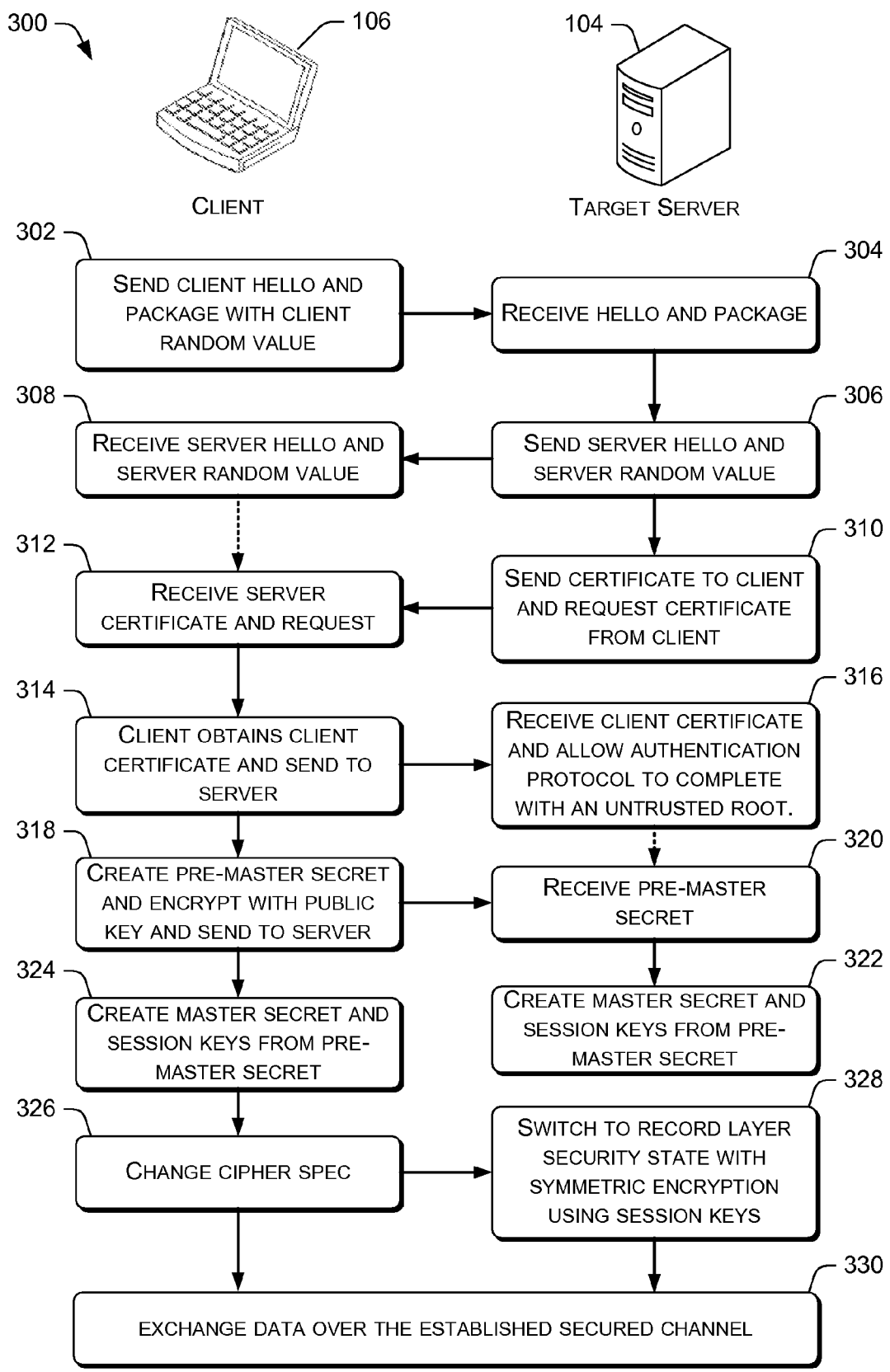
FIG. 3 is a flow diagram of at least one embodiment of a process of authenticating a client having an untrusted root to a server having a trusted root.

FIG. 3 is a flow diagram of at least one embodiment of a process 300 of authenticating the client 106 having an untrusted root to the target server 104 having a trusted root. The process 300 is illustrated as a collection of blocks in a logical flow graph, which represent an exemplary sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described through this disclosure, in addition to process 300, shall be interpreted accordingly.

As shown in FIG. 3, at 302, the client 106 may transmit a "client hello" message to the target server 104, along with a client random value associated with the client and supported cipher suites. For example, the user 102 may connect to the target server through a website, which may enable access to the user's financial information, confidential information, or information the user desires to protect from third party interception, modification, or exploitation. During a connection with the target server 104, the client 106 may transmit the client hello and package with the client random value. At 304, the target server receives the client hello and package with the client random value.

At 306, the target server 104 may transmit a "server hello" and server random number to the client 106. The client may receive the server hello and the server random value at 308. In addition, the target server may also send the server certificate 114 to the client and request the client certificate 118 from the client at 310. The server certificate 114 may have been issued to the target server 104 as an intermediate certificate authority, which may be verified by the authentication servers 110 that may be the root certificate or otherwise chain up from the target server. Thus, the authenticity of the server certificate 114 may be supported by the authentication servers 110 to enable the user 102 to trust the identity of the target server 104. At 312, the client 106 receives the server certificate 114 and request for the client certificate 118.

In one or more embodiments, the user 102 may direct the client 106 to obtain the client certificate 118 having an untrusted root and transmit the client certificate to the target server at 314. For example, the user 102 may insert the issued certificate 202 (e.g., a national ID smart card) into the storage media reader 204 (e.g., a smart card reader, etc.), which is connected to the client 106, for transmission to the target server 104 via the network 108. The user may also direct the client 106 to retrieve the client certificate 118 from a computer readable media, such as the client's hard drive, a flash USB device, an SD card, or other computer readable media in connection with the client. In some embodiments, the client 106 may provide a user interface that enables the user 102 to select a certificate type and location, such as by browsing client's folders to locate a certificate accessible to the client.

In accordance with embodiments, the target server 104 may receive the client certificate 118 at 316. Typically, when a server receives a certificate with an untrusted root, an error is returned and the authentication process is terminated. However, in one or more embodiments of the disclosure, the target server 104 may accept the client certificate 118 at 316 as a valid certificate but with an untrusted root. The target server 104 may allow the authentication to complete, such as a transport layer security (TLS) authentication, and stores the client certificate 118 as associated to a socket and/or session. The security context of the authentication may be set to a level associated with the untrusted root, such as a "guest" security context until further validation has occurred. For example, the certificate may be matched to a user account by a server application running on the target server 104, such as by matching the certificate to a known username and password. In some embodiments, the target server's authentication protocol may be modified to add a "guest" security context to enable acceptance of the client certificate 118 having an untrusted root. The target server 104 may implement the modified protocol that allows for out-of-band identity verification rather than traditional chain building via a hierarchical structure on the client side. In embodiments, the target server 104 may effectively use the public key as a password replacement.

At 318, the client 106 may create a pre-master secret, encrypt it with the public key from the server certificate 114, and transmit the encrypted pre-master secret to the target server 104. The target server may receive the encrypted pre-master secret at 320. At 322, the target server 104 generates a master secret and session keys based on the pre-master secret. At 324, the client 106 may generate a master secret and session keys based on the pre-master secret. At 326, the client transmits a "change cipher specification" notification to the target server to indicate that the client will start using the new session keys for hashing and encrypting messages. The client may also send a "client finished" message to the target server at 326. At 328, the target server receives the "change cipher specification" message from the client and switches the server's record layer security state to symmetric encryption using the session keys. At 328, the target server 104 also sends a "server finished" message to the client 106.

In accordance with one or more embodiments, at 330, the client 106 and the target server 104 may now exchange data over the secured channel the client and target server have established in the process 300. The data that is exchanged between the client and server is encrypted using the session key.

Figure 4:
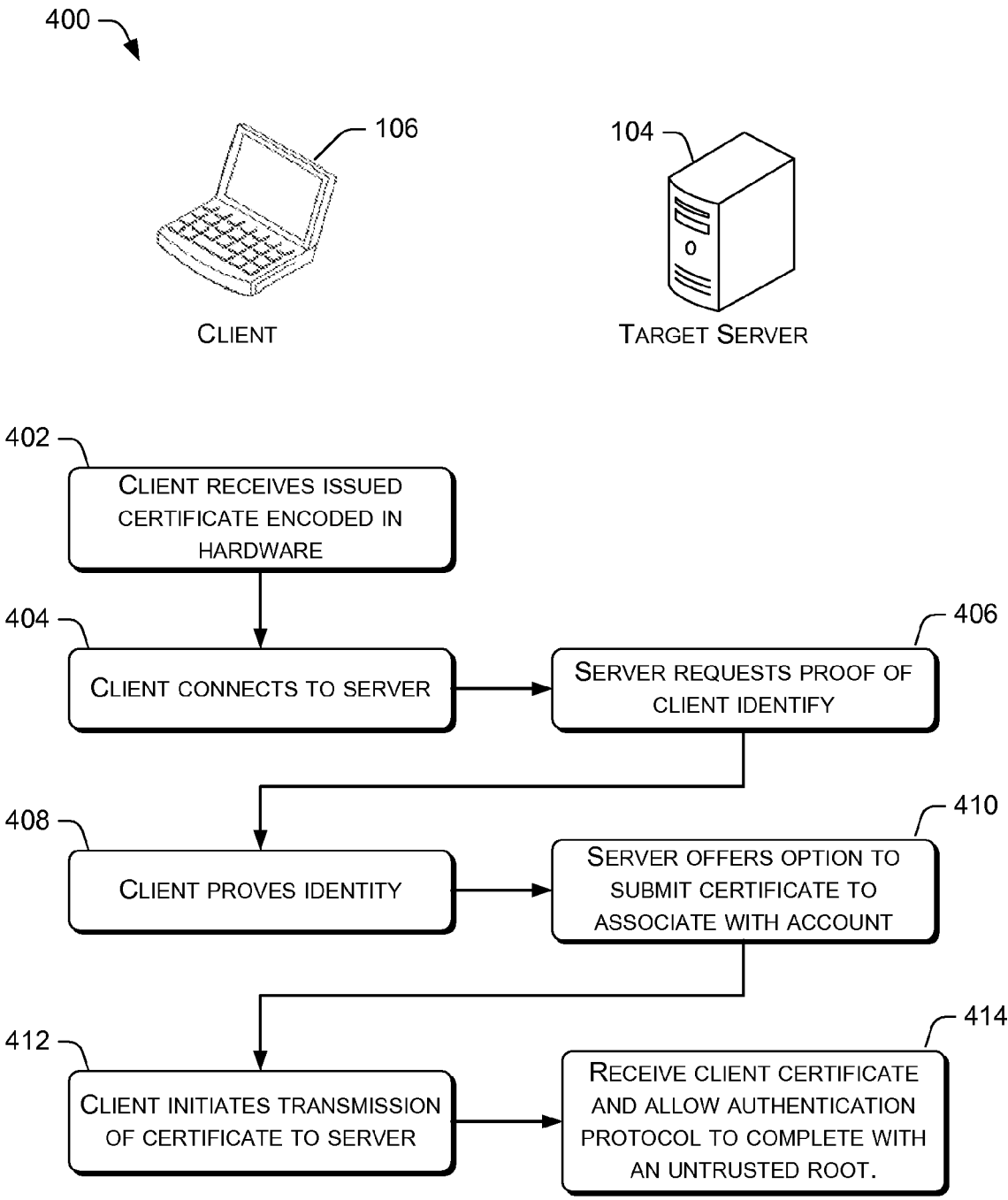
FIG. 4 is a flow diagram of at least one embodiment of a process of authenticating a client having an issued certificate encoded in hardware that has an untrusted root relative to a target server.
Figure 5:
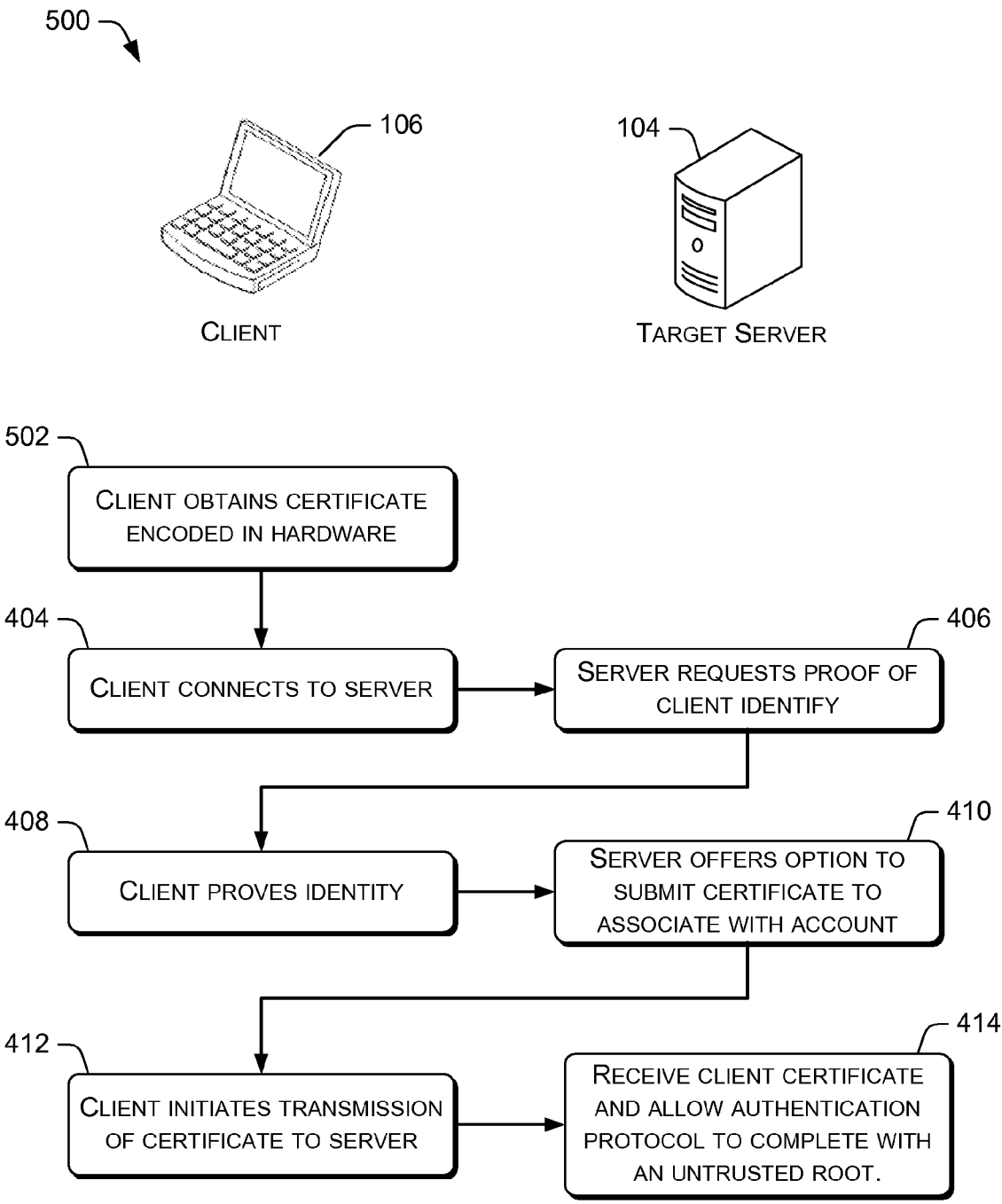
FIG. 5 is a flow diagram of at least one embodiment of a process of authenticating a client that has obtained a certificate encoded in hardware that has an untrusted root.
Figure 6:
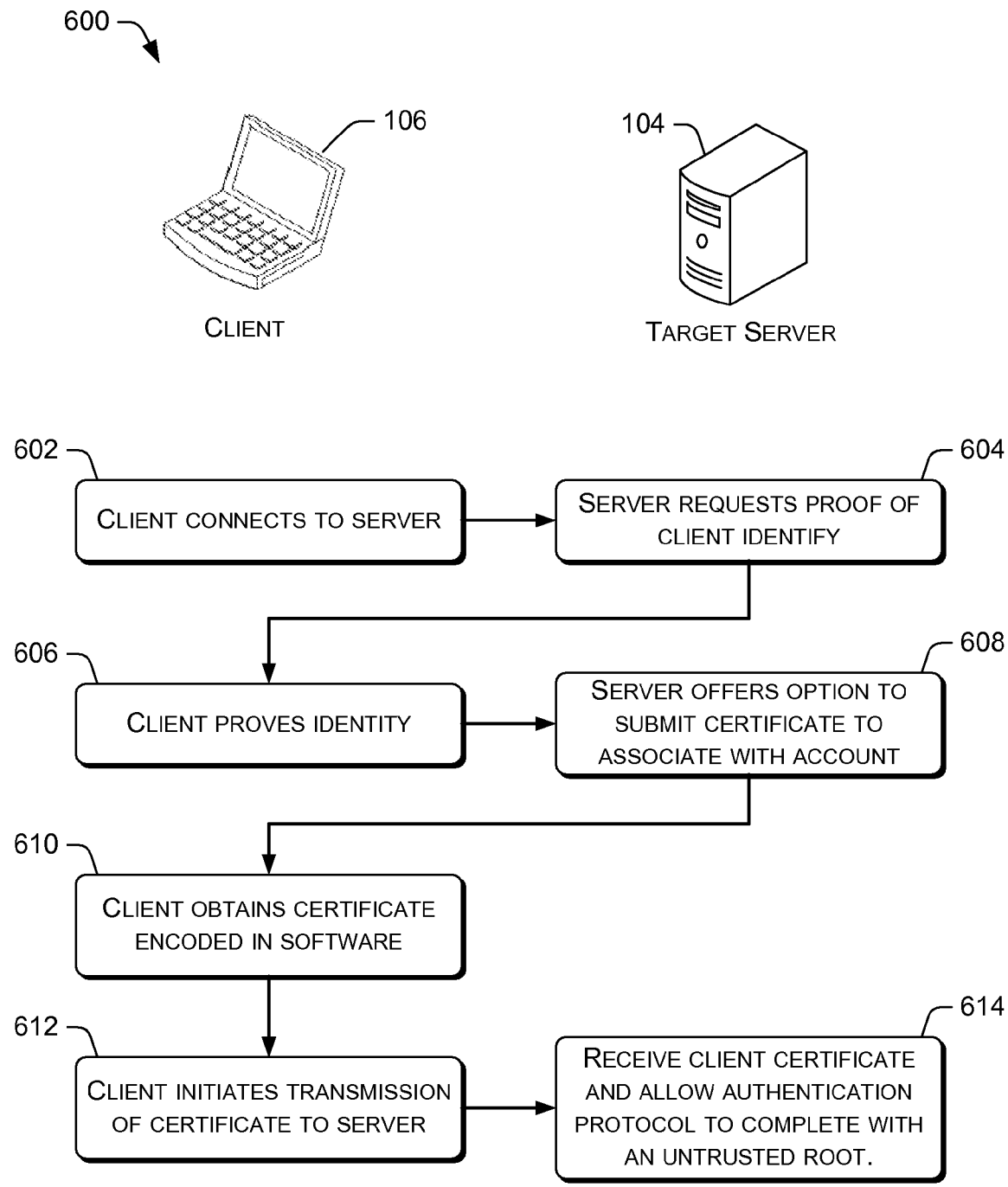
FIG. 6 is a flow diagram of at least one embodiment of a process of authenticating a client that creates a certificate in software which has an untrusted root.

FIGS. 4-6 describe embodiments of the process 300 using each of the client certificates 118 as described in FIG. 2, including the issued certificate 202, the generic certificate 206, and the generated certificate 208. In addition, FIGS. 4-6 illustrate the target server 104 mapping the client certificate 118 to an existing identity using a database or a directory, and associating a security token to that session which can be retrieved by server applications. In the processes described in FIGS. 4-6, similar to the process 300, the order in which the operations are described is not intended to be construed as a limitation, and any number of the described blocks can be combined in any order and/or in parallel to implement the process.

FIG. 4 is a flow diagram of at least one embodiment of a process 400 of authenticating the client 106 having an issued certificate encoded in hardware that has an untrusted root relative to the target server 104. At 402, via the user, the client may be issued a certificate encoded in hardware (e.g., the issued certificate 202 of FIG. 2). For example, the issued certificate may be a government issued identification card (ID card) (i.e., public ID), an employer ID card (i.e., private ID), a mobile phone having a certificate, or another trusted certificate that is issued to the client from a third party, typically unrelated to the target server 104.

At 404, the client 106 may connect to the target server 104. The target server 104 requests proof of the client identity at 406. For example, the target server may cause the client to display a login and password user interface for manipulation by the user 102. At 408, the client satisfies the request of proof of client identity from 404. For example, the user 102 may enter the username and the password associated with a user account.

At 410, the target server 104 may provide an option to enable the user 102, via the client 106, to associate the user account with the issued certificate encoded in hardware from 402. For example, the target server may cause the client to display a user interface that enables the user 102 to selectively associate the issued certificate to the user account. At 412, the client 106 may transmit the issued certificate to the target server 104. At 416, the target server may associate the issued certificate to the user account. Additionally, the target server 104 may allow an authentication protocol such as a TLS protocol to complete despite the issued certificate having an untrusted root by the target server.

In one or more embodiments, the process 400 may accept the issued certificate before the user 102, via the client 106, proves the user's identity to the target server to associate the user account with the issued certificate. Alternatively or additionally, the target server may associate the user account with the user 102 and client 106, and then request the client to provide an issued certificate for association with the user account. Further, the user 102 may use the issued certificate instead of the user login and password, or other identification methods, to gain access to the target server 104 after the process 400 is successfully completed. Thus, the target server 104 may map the user account to the issued certificate and associate a security token to that session enabling the user 102 to access the user account without additional data entry or requests from the target server.

FIG. 5 is a flow diagram of at least one embodiment of a process 500 of authenticating a client that has obtained a certificate encoded in hardware that has an untrusted root. Many of the operations in the process 500 are similar to those in the process 400 described with reference to FIG. 4. Therefore, similar or identical operations in FIG. 5 will not be discussed in detail.

In accordance with one or more embodiments, via the user 102, the client 106 may obtain a generic certificate (e.g., the generic certificate 206 of FIG. 2) encoded in hardware at 502.

For example, the generic certificate may be acquired in a marketplace, such as an electronics store, an online retailer, a grocery store, or a convenience store. The user 102 may insert the generic certificate 206 into the storage media reader 204, in communication with the client 106, when the target server 104 requests a certificate from the user 102. The generic certificate typically does not have a trusted root and is unrelated to the target server 104. Acceptance of the generic certificate by the target server 104 may be advantageous to shift the cost of the certificate to the user 102, to enable the user to use certificates for multiple servers that are unrelated on each other, to enable quick replacement of lost or damaged certificates, or for other reasons.

FIG. 6 is a flow diagram of at least one embodiment of a process 600 of authenticating a client that creates a certificate in software which has an untrusted root. At 602, the client 106 connects to the target server 104. The target server 104 may request proof of the client identity at 604. At 606, the client may satisfy the request of proof of client identity from 602. At 608, the target server 104 may provide an option to enable the user 102, via the client 106, to associate the user account with a client certificate, such as the client certificate 118.

In accordance with one or more embodiments, the user 102 may obtain a generated certificate (e.g., the generated certificate 208 of FIG. 2) at 610. The generated certificate may be generated by software installed on the client 106 or may be generated by a third party, such as an online retailer. In some embodiments, the user 102 may log into another server to obtain a software based generated certificate to transmit to the target server 104. The user 102 may also download a software based certificate to the client 106, and then transmit the certificate to the target server, such as via an upload user interface on the client. In further embodiments, a cloud service may enable a user to manage one or more certificates, which could be downloaded to a user device such as the client 106 or may be used by directing the target server 104 to obtain the generated certificate from the cloud service (or vice-versa). The generated certificate may enable the user 102 to log into the target server 104 with an additional identity other than an identity established in a previous session, or anonymously, such as when the issued certificate is used to log into the target server.

Each server (e.g., the target server 104) may require different levels of proof of identity before associating the generated certificate (or any other certificate) to the user 102. For example, the target server may require a user account association, validation of an email address, or other identify verification steps before associating the certificate having an untrusted root to the user 102.

Continuing with FIG. 6, the client 106 initiates transmission of the generated certificate to the target server at 612. At 614, the target server 104 may associate the generated certificate to the user account. Additionally, the target server may allow an authentication protocol such as a TLS protocol to complete despite the generated certificate having an untrusted root by the target server.

Illustrative User Interface

Figure 7:
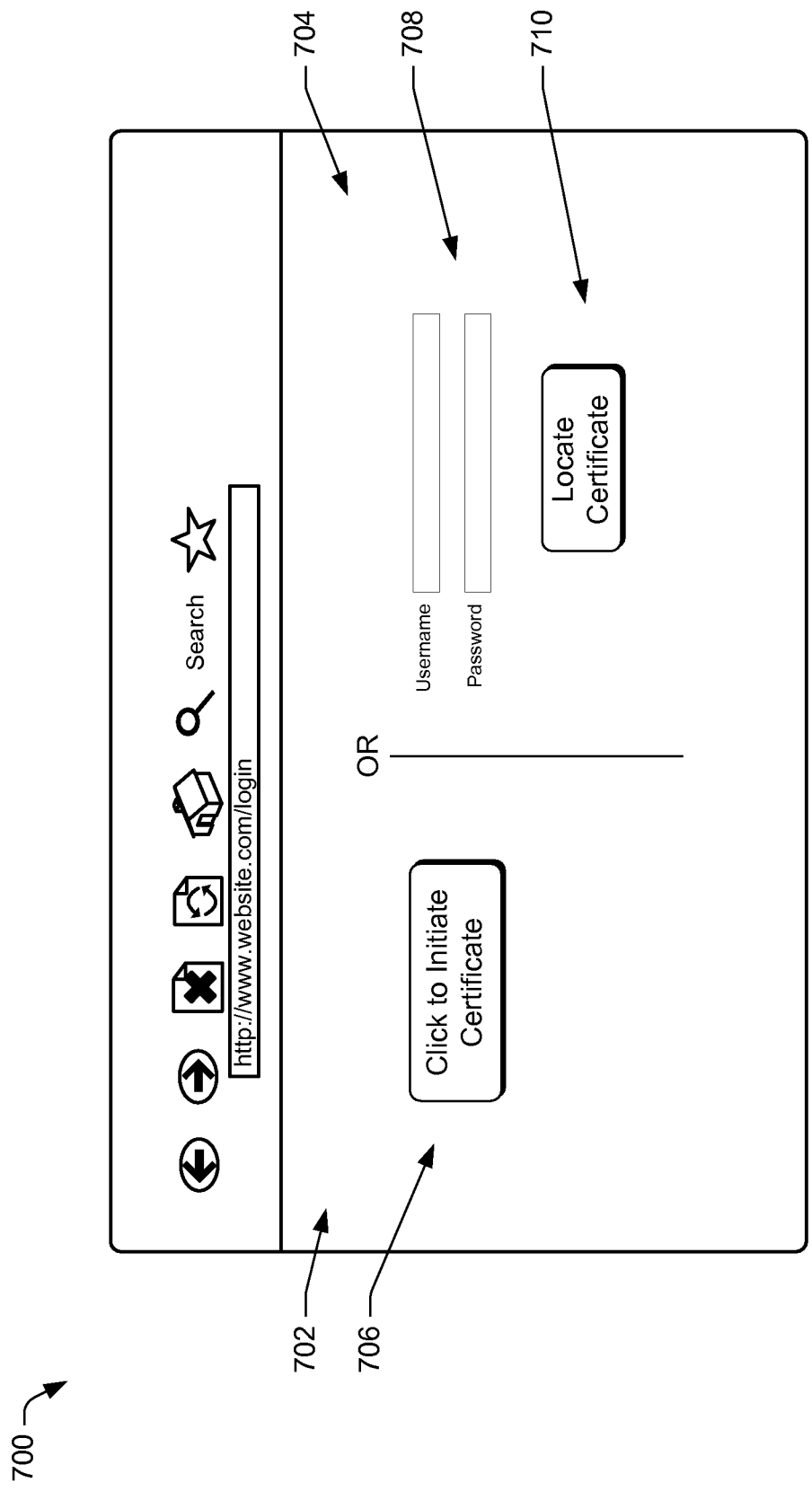
FIG. 7 shows an illustrative user interface to initiate authentication of an untrusted root by a server.

FIG. 7 shows an illustrative user interface 700 to initiate authentication of an untrusted root by a server. The user interface 700 may have at least one of a first portion 702 and a second portion 704. The first portion may enable the user 102 to create a secure connection between the client 106 and the target server 104. For example, the user 102 may click a button 706, or take other relatively simple actions, to initiate an authentication process, such as the process 300 of FIG. 3. In one or more embodiments, the user may use a one-click registration to create an account to facilitate a secure connection between the client 106 and the target server 104. For example, a user may click the button 706 and insert a smart card (e.g., national ID card, etc.) into a smart card reader. The client 106 may send the certificate to the target server 104, which may be able to create an account with the information contained in the certificate. As described above, the certificate may have an untrusted root relative to the target server 104, while still enabling the user to obtain a secure connection with the target server via the client 106. In some embodiments, the user interface 700 may include a certificate selection menu, such as a pull down menu, to enable the user to select a certificate for a session on the target server.

In further embodiments, the user 102 may transmit the certificate to the target server by simply connecting with the user interface 700, such as by directing the user's browser residing on the client 106 to navigate to a uniform resource locator (URL) associated with the target server 104. The target server may recognize the client, and search for the certificate in a predetermined location such as the last location used for the client. Additionally or alternatively, the user 102 may insert a certificate into a storage media reader when the client has navigated to the user interface 700, which may then initiate a secure connection between the client and the target server without further action by the user 102.

The second portion of the user interface may enable the user 102 to associate an existing account with a certificate. In one or more embodiments, a login prompt 708 may enable a user to enter information, such as a username and password, to gain access to a user account. At 710, the user may also locate a certificate to associate the certificate with the user account related to the login prompt 708.

Illustrative Computing Environment

Figure 8:
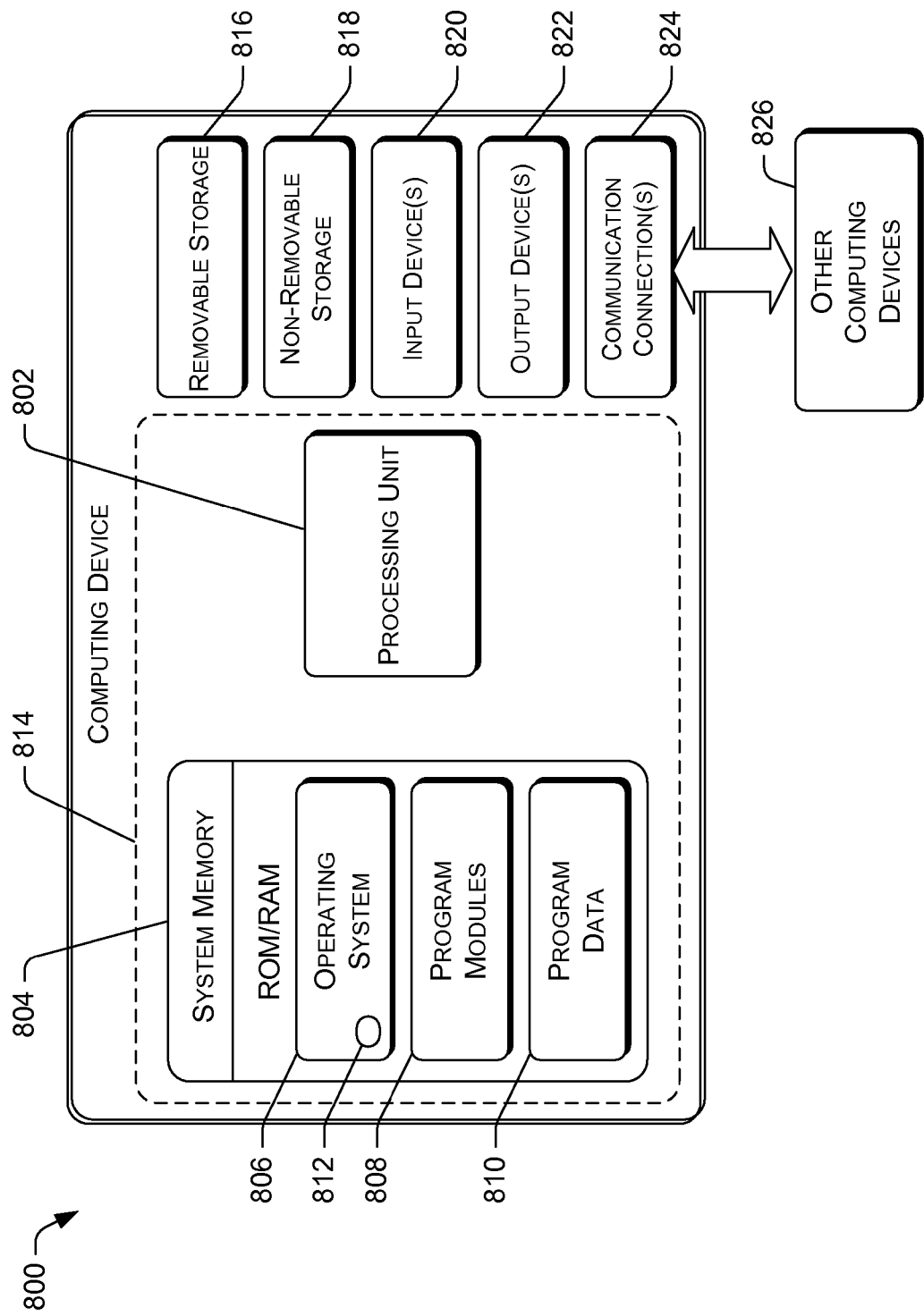
FIG. 8 shows a block diagram of an illustrative computing device which may be part of the system show in FIG. 1.

FIG. 8 illustrates a representative computing device 800 that may be used to implement the selective networked resource access techniques and mechanisms described herein. For example, the target server 104 or the client 106 of FIG. 1 may be implemented on the representative computing device 800. However, it will readily be appreciated that the various embodiments of the selective networked resource techniques and mechanisms may be implemented in other computing devices, systems, and environments. The computing device 800 shown in FIG. 8 is only one example of a computing device and is not intended to suggest any limitation as to the scope of use or functionality of the computer and network architectures. The computing device 800 is not intended to be interpreted as having any dependency or requirement relating to any one or combination of components illustrated in the example computing device.

In a very basic configuration, the computing device 800 typically includes at least one processing unit 802 and system memory 804. Depending on the exact configuration and type of computing device, the system memory 804 may be volatile (such as RAM), non-volatile (such as ROM, flash memory, etc.) or some combination of the two. The system memory 804 typically includes an operating system 806, one or more program modules 808, and may include program data 810. The operating system 806 includes a component-based framework 812 that supports components (including properties and events), objects, inheritance, polymorphism, reflection, and provides an object-oriented component-based application programming interface (API). The computing device 800 is of a very basic configuration demarcated by a dashed line 814. Again, a terminal may have fewer components but will interact with a computing device that may have such a basic configuration.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 816 and non-removable storage 818. Computer storage media may include volatile and nonvolatile, removable and non-removable media implemented in any method or technology for storage of information, such as computer readable instructions, data structures, program modules, or other data. The system memory 804, the removable storage 816, and the non-removable storage 818 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 800. Any such computer storage media may be part of the computing device 800. The computing device 800 may also have input device(s) 820 such as keyboard, mouse, pen, voice input device, touch input device, etc. Output device(s) 822 such as a display, speakers, printer, etc. may also be included. These devices are well know in the art and are not discussed at length here.

The computing device 800 may also contain communication connections 824 that allow the device to communicate with other computing devices 826, such as over a network. These networks may include wired networks as well as wireless networks. The communication connections 824 are one example of communication media. The communication media may typically be embodied by computer readable instructions, data structures, program modules, etc.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

An implementation of authentication using an untrusted root may enable users to access a target server with a client using a more secure connection. This enhanced security may be especially important for the protection of high end, valuable, expensive or sensitive resources, applications or data. Distribution of client certificates is simplified by allowing the user to use an issued certificate from another source, a generic certificate, or a generated certificate. Therefore, the expense of the certificate is shifted to the user, no hierarchy trust chain is necessary, and configuration requires less time and resources.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A method of obtaining a certificate, comprising:
receiving a request for a certificate during an authentication process with a server, the authentication process being implemented using a security protocol that is modified to accept an untrusted certificate and automatically complete the authentication process;
obtaining the untrusted certificate from at least one of a hardware based certificate device or a storage device, wherein the untrusted certificate does not chain up to a root certificate authority that is recognized by the server;
transmitting the untrusted certificate to the server;
receiving a guest registration as a guest when the untrusted certificate is not initially associated by the server with a trusted certificate authority, the guest registration having the security protocol set to a level associated with the untrusted certificate that is different from a level associated with a trusted certificate;
storing the untrusted certificate;
associating the stored untrusted certificate with a session and a client account; and
converting the guest registration to a standard registration having the security protocol set to the level associated with the trusted certificate in response to matching the untrusted certificate to an existing user account.

2. The method of claim 1, wherein the security protocol is a transport layer security (TLS) security protocol.

3. The method of claim 1, wherein the untrusted certificate and associated private key is stored in cryptographic hardware.

4. The method of claim 1, wherein the untrusted certificate is software data stored in a computer-readable storage media.

5. The method of claim 1, further comprising associating a user with an account made accessible by the server.

6. The method of claim 5, wherein the associating the user with the account includes associating the untrusted certificate using an account identifier and password, and the untrusted certificate is not authorized by the server.

7. One or more non-signal computer readable storage media comprising computer-executable instructions that, when executed by a computer, perform acts comprising:
determining, by a server, a client account associated with a client;
receiving a certificate associated with an untrusted root from the client, the certificate being unrecognizable by the server;
modifying an authentication protocol to allow certificates associated with untrusted roots certificate, the modified authentication protocol accepting the certificates associated with untrusted roots certificate as valid certificates and automatically completing the authentication protocol;
automatically registering the client as a guest when the unrecognizable certificate is not associated with a trusted certificate authority, a guest registration having a security protocol set to a level associated with the unrecognizable certificate that is different from a level associated with a recognizable certificate;
storing the unrecognizable certificate;
associating the client account to the unrecognizable certificate without being requested for further validation;
allowing access to the client account associated with the unrecognizable certificate; and converting the guest registration to a standard registration having the security protocol set to the level associated with the recognizable certificate in response to matching the unrecognizable certificate to the client account or another client account.

8. The one or more non-signal computer readable storage media of claim 7, further comprising one or more computer-executable instructions that, when executed by a computer, performs using a certificate directory to associate a key to the client account.

9. The one or more non-signal computer readable storage media of claim 7, wherein the registering the client as the guest includes accepting an identity representation received from the client.

10. The one or more non-signal computer readable storage media of claim 7, further comprising one or more computer-executable instructions that, when executed by a computer, performs causing the client to display a certificate initiation prompt.

11. The one or more non-signal computer readable storage media of claim 7, wherein the certificate is contained on an identification card issued by a government agency and wherein the server is not associated with the government agency.

12. The one or more non-signal computer readable storage media of claim 7, wherein the certificate is contained on a smartcard.

13. The one or more non-signal computer readable storage media of claim 7, wherein the determining the client account associated with the client includes directing the client to access the client account using an account identifier and password.

14. The one or more non-signal computer readable storage media of claim 7, further comprising one or more computer-executable instructions that, when executed by a computer, performs initiating a record layer security state with symmetric encryption.

15. A method, comprising:
registering an account with a server;
receiving a request from the server for a client certificate associated with the account;
generating the client certificate, the client certificate being an untrusted certificate that does not chain up to a root certificate authority that is recognized by the server;
transmitting the untrusted certificate to the server to create a two-directional secure transmission layer;
receiving registration as a guest when the untrusted certificate is not associated by the server with a trusted certificate authority, a guest registration having a security protocol set to a level associated with the untrusted certificate that is different from a level of the security protocol associated with a trusted certificate;
receiving access to the account associated to the untrusted certificate without an additional request for validation; and
converting the guest registration to a standard registration having the security protocol set to the level associated with the trusted certificate in response to matching the untrusted certificate to the account or another account.

16. The method of claim 15, wherein the generating the client certificate includes generating a software based certificate and private key.

17. The method of claim 16, wherein the software based certificate is generated by a certificate generating server that is not associated with the server.

18. The method of claim 15, wherein the client certificate and associated private key is contained in an integrated circuit card.

19. The method of claim 15, wherein the receiving a request from the server for the client certificate includes receiving a request from the server for an account identifier and password.

20. The method of claim 1, wherein the receiving registration as the guest comprises:
generating a pre-master secret;
encrypting the pre-master secret with a public encryption key of the server;
transmitting the encrypted pre-master secret to the server; and
generating a master secret and session keys based on the pre-master secret for secure communication with the server.

* * * * *